United States Patent
Yasuda et al.

(10) Patent No.: US 8,085,288 B2
(45) Date of Patent: Dec. 27, 2011

(54) EXPOSURE SYSTEM WITH A PLURALITY OF LASER SOURCES LOCATED AT DISPERSED SITES

(75) Inventors: Satoshi Yasuda, Kyoto (JP); Mamoru Fujimoto, Kyoto (JP); Hiroshi Iwasa, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 925 days.

(21) Appl. No.: 12/081,399

(22) Filed: Apr. 15, 2008

(65) Prior Publication Data
US 2008/0259301 A1    Oct. 23, 2008

(30) Foreign Application Priority Data
Apr. 20, 2007   (JP) .................... 2007-111683

(51) Int. Cl.
*B41J 2/435*   (2006.01)
*B41J 2/47*   (2006.01)
(52) U.S. Cl. ........................ 347/234; 347/248
(58) Field of Classification Search .................. 347/229, 347/234, 238, 248
See application file for complete search history.

(56) References Cited

U.S. PATENT DOCUMENTS

| | | | |
|---|---|---|---|
| 5,351,617 A | 10/1994 | Williams et al. | |
| 6,252,622 B1 * | 6/2001 | Laberge | 347/238 |
| 6,456,397 B1 | 9/2002 | Chase et al. | |
| 6,798,437 B2 * | 9/2004 | Seibert | 347/234 |
| 6,862,034 B2 * | 3/2005 | Ernst et al. | 347/233 |

FOREIGN PATENT DOCUMENTS

| | | |
|---|---|---|
| JP | 09-222766 | 8/1997 |
| JP | 2000-043317 | 2/2000 |
| JP | 2003-089180 | 3/2003 |
| JP | 2005-238632 | 9/2005 |
| JP | 2005238632 A * | 9/2005 |
| JP | 2006-088437 | 4/2006 |
| JP | 2006-264282 | 10/2006 |
| JP | 2008-256863 | 10/2008 |

OTHER PUBLICATIONS

Japanese Office Action, w/ English translation thereof, issued in Japanese Patent Application No. JP 2007-111683 dated Nov. 17, 2009.
Japanese Decision of Grant issued in Japanese Patent Application No. JP 2007-111683 dated Feb. 9, 2010.

* cited by examiner

*Primary Examiner* — Hai C Pham
(74) *Attorney, Agent, or Firm* — McDermott Will & Emery LLP

(57) ABSTRACT

A CTP system is provided, which allows its continuous use even if some of laser diodes located at dispersed sites are in a non-light emitting state due to breakage or the like. In the case where some channels are in the non-light emitting state, channel-by-channel exposure data is generated to describe the way that exposure should be performed by use of specific light-emitting channels that are determined by the locations of non-light emitting channels, while an exposure head is moved also through (a) complementary interval(s) before and/or after a standard interval, the standard interval being the interval the exposure head is moved through in normal mode. Then, the transport unit moves the exposure head through the standard interval and through the complementary interval(s), during which period the exposure controller causes the specific light-emitting channels to emit exposure light according to the channel-by-channel exposure data, thereby forming an exposed area.

7 Claims, 12 Drawing Sheets

F I G . 1
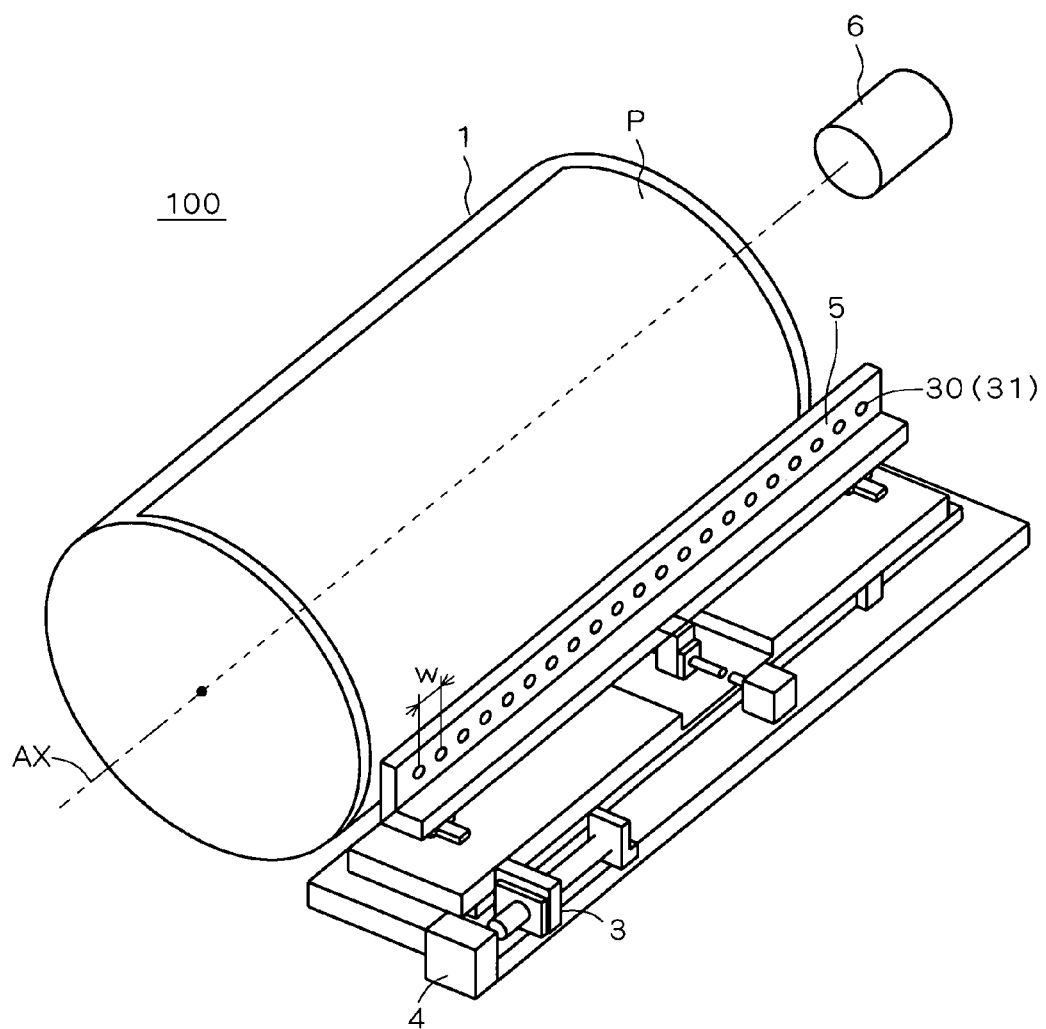

F I G . 6

| CHANNEL | 1ch | 2ch | 3ch | 4ch | 5ch | 6ch |
|---|---|---|---|---|---|---|
| LIGHT EMITTING ○ / NON-LIGHT EMITTING ● | ○ | ○ | ○ | ○ | ○ | ○ |
| INTERVAL OF HEAD MOVEMENT | OBJECT RECORDED ON EACH CHANNEL ||||||
| ZEROTH INTERVAL × | × | × | × | × | × | × |
| FIRST INTERVAL ↓ | im1 | im2 | im3 | im4 | im5 | im6 |
| SECOND INTERVAL × | × | × | × | × | × | × |

FIG. 7A

| CHANNEL | 1ch | 2ch | 3ch | 4ch | 5ch | 6ch |
|---|---|---|---|---|---|---|
| LIGHT EMITTING ○ / NON-LIGHT EMITTING ● | ○ | ● | ○ | ○ | ○ | ○ |
| INTERVAL OF HEAD MOVEMENT | OBJECT RECORDED ON EACH CHANNEL | | | | | |
| ZEROTH INTERVAL × | × | × | × | × | × | × |
| FIRST INTERVAL ↓ | im1 | × | im3 | × | im5 | × |
| SECOND INTERVAL ↓ | im2 | × | im4 | × | im6 | × |

FIG. 7B

| CHANNEL | 1ch | 2ch | 3ch | 4ch | 5ch | 6ch |
|---|---|---|---|---|---|---|
| LIGHT EMITTING ○ / NON-LIGHT EMITTING ● | ● | ○ | ○ | ○ | ● | ○ |
| INTERVAL OF HEAD MOVEMENT | OBJECT RECORDED ON EACH CHANNEL | | | | | |
| ZEROTH INTERVAL ↓ | × | im1 | × | im3 | × | im5 |
| FIRST INTERVAL ↓ | × | im2 | × | im4 | × | im6 |
| SECOND INTERVAL × | × | × | × | × | × | × |

FIG. 7C

| CHANNEL | 1ch | 2ch | 3ch | 4ch | 5ch | 6ch |
|---|---|---|---|---|---|---|
| LIGHT EMITTING ○ / NON-LIGHT EMITTING ● | ○ | ● | ○ | ● | ○ | ● |
| INTERVAL OF HEAD MOVEMENT | OBJECT RECORDED ON EACH CHANNEL | | | | | |
| ZEROTH INTERVAL × | × | × | × | × | × | × |
| FIRST INTERVAL ↓ | im1 | × | im3 | × | im5 | × |
| SECOND INTERVAL ↓ | im2 | × | im4 | × | im6 | × |

FIG. 8A

| CHANNEL | | 1ch | 2ch | 3ch | 4ch | 5ch | 6ch |
|---|---|---|---|---|---|---|---|
| LIGHT EMITTING ○ / NON-LIGHT EMITTING ● | | ○ | ● | ○ | ○ | ● | ○ |
| INTERVAL OF HEAD MOVEMENT | | OBJECT RECORDED ON EACH CHANNEL | | | | | |
| ZEROTH INTERVAL | × | × | × | × | × | × | × |
| FIRST INTERVAL | ↓ | im1 | × | im3 | im4 | × | im6 |
| SECOND INTERVAL | ↓ | im2 | × | × | im5 | × | × |

FIG. 8B

| CHANNEL | | 1ch | 2ch | 3ch | 4ch | 5ch | 6ch |
|---|---|---|---|---|---|---|---|
| LIGHT EMITTING ○ / NON-LIGHT EMITTING ● | | ● | ○ | ○ | ● | ○ | ○ |
| INTERVAL OF HEAD MOVEMENT | | OBJECT RECORDED ON EACH CHANNEL | | | | | |
| ZEROTH INTERVAL | ↓ | × | im1 | × | × | im4 | × |
| FIRST INTERVAL | ↓ | × | im2 | im3 | × | im5 | im6 |
| SECOND INTERVAL | × | × | × | × | × | × | × |

FIG. 9

| CHANNEL | | 1ch | 2ch | 3ch | 4ch | 5ch | 6ch |
|---|---|---|---|---|---|---|---|
| LIGHT EMITTING ○ / NON-LIGHT EMITTING ● | | ● | ○ | ○ | ○ | ○ | ● |
| INTERVAL OF HEAD MOVEMENT | | OBJECT RECORDED ON EACH CHANNEL | | | | | |
| ZEROTH INTERVAL | ↓ | × | im1 | × | × | × | × |
| FIRST INTERVAL | ↓ | × | im2 | im3 | im4 | im5 | × |
| SECOND INTERVAL | ↓ | × | | × | × | im6 | × |

FIG. 10A

| CHANNEL | 1ch | 2ch | 3ch | 4ch | 5ch | 6ch |
|---|---|---|---|---|---|---|
| LIGHT EMITTING ○ / NON-LIGHT EMITTING ● | ○ | ● | ● | ○ | ○ | ○ |
| INTERVAL OF HEAD MOVEMENT | OBJECT RECORDED ON EACH CHANNEL | | | | | |
| ZEROTH INTERVAL ↓ | × | × | × | im3 | × | × |
| FIRST INTERVAL ↓ | im1 | × | × | im4 | im5 | im6 |
| SECOND INTERVAL ↓ | im2 | × | × | × | × | × |

FIG. 10B

| CHANNEL | 1ch | 2ch | 3ch | 4ch | 5ch | 6ch |
|---|---|---|---|---|---|---|
| LIGHT EMITTING ○ / NON-LIGHT EMITTING ● | ○ | ○ | ● | ● | ○ | ○ |
| INTERVAL OF HEAD MOVEMENT | OBJECT RECORDED ON EACH CHANNEL | | | | | |
| ZEROTH INTERVAL ↓ | × | × | × | × | im4 | × |
| FIRST INTERVAL ↓ | im1 | im2 | × | × | im5 | im6 |
| SECOND INTERVAL ↓ | × | im3 | × | × | × | × |

FIG. 10C

| CHANNEL | 1ch | 2ch | 3ch | 4ch | 5ch | 6ch |
|---|---|---|---|---|---|---|
| LIGHT EMITTING ○ / NON-LIGHT EMITTING ● | ○ | ● | ● | ○ | ● | ○ |
| INTERVAL OF HEAD MOVEMENT | OBJECT RECORDED ON EACH CHANNEL | | | | | |
| ZEROTH INTERVAL ↓ | × | × | × | im3 | × | × |
| FIRST INTERVAL ↓ | im1 | × | × | im4 | × | im6 |
| SECOND INTERVAL ↓ | im2 | × | × | im5 | × | × |

FIG. 10D

| CHANNEL | 1ch | 2ch | 3ch | 4ch | 5ch | 6ch |
|---|---|---|---|---|---|---|
| LIGHT EMITTING ○ / NON-LIGHT EMITTING ● | ● | ○ | ○ | ● | ● | ○ |
| INTERVAL OF HEAD MOVEMENT | OBJECT RECORDED ON EACH CHANNEL | | | | | |
| ZEROTH INTERVAL ↓ | × | im1 | × | × | × | im5 |
| FIRST INTERVAL ↓ | × | im2 | im3 | × | × | im6 |
| SECOND INTERVAL ↓ | × | × | im4 | × | × | × |

F I G . 1 1

| CHANNEL | | 1ch | 2ch | 3ch | 4ch | 5ch | 6ch |
|---|---|---|---|---|---|---|---|
| LIGHT EMITTING ○ /NON-LIGHT EMITTING ● | | ● | ○ | ● | ● | ○ | ● |
| INTERVAL OF HEAD MOVEMENT | | OBJECT RECORDED ON EACH CHANNEL | | | | | |
| ZEROTH INTERVAL | ↓ | × | im1 | × | × | im4 | × |
| FIRST INTERVAL | ↓ | × | im2 | × | × | im5 | × |
| SECOND INTERVAL | ↓ | × | im3 | × | × | im6 | × |

F I G . 1 2 A

| CHANNEL | | 1ch | 2ch | 3ch | 4ch | 5ch | 6ch |
|---|---|---|---|---|---|---|---|
| LIGHT EMITTING ○ /NON-LIGHT EMITTING ● | | ○ | ● | ● | ○ | ○ | ○ |
| INTERVAL OF HEAD MOVEMENT | | OBJECT RECORDED ON EACH CHANNEL | | | | | |
| ZEROTH INTERVAL | ↓ | × | × | × | im3 | × | × |
| FIRST INTERVAL | ↓ | im1 | × | × | im4 | × | im6 |
| SECOND INTERVAL | ↓ | im2 | × | × | im5 | × | × |

F I G . 1 2 B

| CHANNEL | | 1ch | 2ch | 3ch | 4ch | 5ch | 6ch |
|---|---|---|---|---|---|---|---|
| LIGHT EMITTING ○ /NON-LIGHT EMITTING ● | | ○ | ○ | ● | ● | ○ | ○ |
| INTERVAL OF HEAD MOVEMENT | | OBJECT RECORDED ON EACH CHANNEL | | | | | |
| ZEROTH INTERVAL | ↓ | × | × | × | × | im4 | × |
| FIRST INTERVAL | ↓ | im1 | im2 | × | × | im5 | × |
| SECOND INTERVAL | ↓ | × | im3 | × | × | im6 | × |

F I G . 1 3

| CHANNEL | | 1ch | 2ch | 3ch | 4ch | 5ch | 6ch |
|---|---|---|---|---|---|---|---|
| LIGHT EMITTING ○ / NON-LIGHT EMITTING ● | | ○ | ○ | ○ | ○ | ○ | ○ |
| INTERVAL OF HEAD MOVEMENT | | OBJECT RECORDED ON EACH CHANNEL | | | | | |
| ZEROTH INTERVAL | ↓ | im1 | im2 | im3 | im4 | im5 | im6 |
| FIRST INTERVAL | × | × | × | × | × | × | × |
| SECOND INTERVAL | × | × | × | × | × | × | × |

FIG. 14A

| CHANNEL | | 1ch | 2ch | 3ch | 4ch | 5ch | 6ch |
|---|---|---|---|---|---|---|---|
| LIGHT EMITTING ○ / NON-LIGHT EMITTING ● | | ○ | ● | ○ | ○ | ○ | ○ |
| INTERVAL OF HEAD MOVEMENT | | OBJECT RECORDED ON EACH CHANNEL | | | | | |
| ZEROTH INTERVAL | ↓ | im1 | × | im3 | im4 | im5 | im6 |
| FIRST INTERVAL | ↓ | im2 | × | × | × | × | × |
| SECOND INTERVAL | × | × | × | × | × | × | × |

FIG. 14B

| CHANNEL | | 1ch | 2ch | 3ch | 4ch | 5ch | 6ch |
|---|---|---|---|---|---|---|---|
| LIGHT EMITTING ○ / NON-LIGHT EMITTING ● | | ○ | ○ | ● | ○ | ● | ○ |
| INTERVAL OF HEAD MOVEMENT | | OBJECT RECORDED ON EACH CHANNEL | | | | | |
| ZEROTH INTERVAL | ↓ | im1 | im2 | × | im4 | × | im6 |
| FIRST INTERVAL | ↓ | × | im3 | × | im5 | × | × |
| SECOND INTERVAL | × | × | × | × | × | × | × |

FIG. 14C

| CHANNEL | | 1ch | 2ch | 3ch | 4ch | 5ch | 6ch |
|---|---|---|---|---|---|---|---|
| LIGHT EMITTING ○ / NON-LIGHT EMITTING ● | | ○ | ○ | ○ | ○ | ● | ● |
| INTERVAL OF HEAD MOVEMENT | | OBJECT RECORDED ON EACH CHANNEL | | | | | |
| ZEROTH INTERVAL | ↓ | im1 | im2 | im3 | im4 | × | × |
| FIRST INTERVAL | ↓ | × | × | × | im5 | × | × |
| SECOND INTERVAL | ↓ | × | × | × | im6 | × | × |

F I G . 1 5

| CHANNEL | | 1ch | 2ch | 3ch | 4ch | 5ch | 6ch |
|---|---|---|---|---|---|---|---|
| LIGHT EMITTING ○ /NON-LIGHT EMITTING ● | | ○ | ○ | ○ | ○ | ○ | ○ |
| INTERVAL OF HEAD MOVEMENT | OBJECT RECORDED ON EACH CHANNEL | | | | | | |
| ZEROTH INTERVAL | × | × | × | × | × | × | × |
| FIRST INTERVAL | ↓ | im1 | im2 | im3 | im4 | im5 | im6 |
| SECOND INTERVAL | × | × | × | × | × | × | × |
| THIRD INTERVAL | × | × | × | × | × | × | × |

FIG. 16A

| CHANNEL | 1ch | 2ch | 3ch | 4ch | 5ch | 6ch |
|---|---|---|---|---|---|---|
| LIGHT EMITTING ○ / NON-LIGHT EMITTING ● | ○ | ● | ● | ○ | ● | ○ |
| INTERVAL OF HEAD MOVEMENT | OBJECT RECORDED ON EACH CHANNEL | | | | | |
| ZEROTH INTERVAL | × | × | × | × | × | × |
| FIRST INTERVAL | ↓ | im1 | × | × | im4 | × | × |
| SECOND INTERVAL | ↓ | im2 | × | × | im5 | × | × |
| THIRD INTERVAL | ↓ | im3 | × | × | im6 | × | × |

FIG. 16B

| CHANNEL | 1ch | 2ch | 3ch | 4ch | 5ch | 6ch |
|---|---|---|---|---|---|---|
| LIGHT EMITTING ○ / NON-LIGHT EMITTING ● | ○ | ● | ● | ● | ○ | ● |
| INTERVAL OF HEAD MOVEMENT | OBJECT RECORDED ON EACH CHANNEL | | | | | |
| ZEROTH INTERVAL | ↓ | × | × | × | × | im4 | × |
| FIRST INTERVAL | ↓ | im1 | × | × | × | im5 | × |
| SECOND INTERVAL | ↓ | im2 | × | × | × | im6 | × |
| THIRD INTERVAL | ↓ | im3 | × | × | × | × | × |

FIG. 16C

| CHANNEL | 1ch | 2ch | 3ch | 4ch | 5ch | 6ch |
|---|---|---|---|---|---|---|
| LIGHT EMITTING ○ / NON-LIGHT EMITTING ● | ● | ○ | ● | ● | ● | ○ |
| INTERVAL OF HEAD MOVEMENT | OBJECT RECORDED ON EACH CHANNEL | | | | | |
| ZEROTH INTERVAL | ↓ | × | im1 | × | × | × | im5 |
| FIRST INTERVAL | ↓ | × | im2 | × | × | × | im6 |
| SECOND INTERVAL | ↓ | × | im3 | × | × | × | × |
| THIRD INTERVAL | ↓ | × | im4 | × | × | × | × |

EXPOSURE SYSTEM WITH A PLURALITY OF LASER SOURCES LOCATED AT DISPERSED SITES

BACKGROUND OF THE INVENTION

1. Field of the Invention

The present invention relates to exposure processing in an exposure system in which a plurality of laser sources are located at dispersed sites.

2. Description of the Background Art

As CTP (Computer To Plate) systems for direct imaging on printing plates, those using laser diodes (LDs) in an exposure head (a light source) have been conventionally widely known. Such CTP systems have widely adopted multi-beam exposure methods in which exposure is performed with simultaneous light emission from a plurality of laser diodes.

For example, CTP systems using spiral exposure methods are known, which systems include an exposure head (a multi-channel optical head) including a plurality of laser diodes aligned in one direction and a lens focusing laser beams emitted from those plurality of laser diodes to form an image in a position of exposure, and in which systems with rotation of a drum (printing drum) having a printing plate mounted thereto, laser beams are applied from the laser diodes to expose approximately the entire surface of the printing plate while the exposure head moves in the axial direction of the drum (see, for example, Japanese Patent Application Laid-open No. 2000-43317).

Other CTP systems are also known, which systems include an exposure head with a plurality of laser diodes located at dispersed sites at regular intervals, and in which systems with rotation of a drum (printing drum) having a printing plate mounted thereto, laser beams are applied from the laser diodes directly onto the printing plate while the exposure head moves in the axial direction of the drum by a distance equivalent to the interval between the laser diodes, so as to simultaneously expose a plurality of partial areas and ultimately to expose approximately the entire surface of the printing plate (see, for example, Japanese Patent Application Laid-open No. 2003-89180).

JP-A-2000-43317 discloses the technique in which laser diodes are grouped into two parts, the first half and the second half, and when any of the laser diodes in either the first half or the second half stops emitting light (illuminating) due to its breakage or the like, exposure is performed by use of only the laser diodes in the other half, whereby exposure can be performed continuously without halting the system until the next change of the laser diodes.

However, this technique has a drawback that exposure cannot be performed in the case where the first half and the second half both include a non-light emitting laser diode.

Besides, this technique is, in the first place, aimed at the CTP systems using spiral exposure methods as disclosed in JP-A-2000-43317. Since the CTP systems including a plurality of laser diodes located at dispersed sites, as disclosed in JP-A-2003-89180, have a limited moving range of individual laser diodes during exposure, it is impossible to adopt the technique as disclosed in JP-A-2000-43317 that the laser diodes in the first half, for example, can expose areas that should originally be exposed by the laser diodes in the second half.

SUMMARY OF THE INVENTION

The invention relates to exposure processing in an exposure system for exposing a recording material, in which system a plurality of laser sources are located at dispersed sites, for example, in a CTP (Computer To Plate) system for direct imaging on a printing plate.

According to the invention, the exposure system for exposing a recording material includes: a holder holding a recording material; a plurality of light sources capable of simultaneously emitting exposure light; an exposure head in which the plurality of light sources are located at dispersed sites at regular intervals in a direction of arrangement along the recording material; a transport unit moving the exposure head along the recording material; an exposure-data input unit acquiring general exposure data describing the contents of exposure of the recording material; a channel-by-channel-exposure-data generator generating, based on the general exposure data, channel-by-channel exposure data describing the contents of exposure performed by each of the plurality of light sources; and an exposure controller controlling the plurality of light sources so that exposure light is emitted according to the contents of description of the channel-by-channel exposure data. (a) In a case where the plurality of light sources are all in a light-emitting state, the channel-by-channel-exposure-data generator generates the channel-by-channel exposure data describing the way that an exposed area should be formed by use of the exposure light emitted from all of the plurality of light sources. The exposed area is formed by the exposure controller causing the plurality of light sources to emit exposure light according to the channel-by-channel exposure data while causing the transport unit to move the exposure head through only a standard interval having a distance approximately equal to an interval between the plurality of light sources. (b) In a case where the plurality of light sources includes some non-light emitting light sources, the channel-by-channel-exposure-data generator generates the channel-by-channel exposure data describing the way that the exposed area should be formed by use of the exposure light emitted from a specific light source in the light-emitting state during a period when the exposure head is moved through a complementary interval in addition to the standard interval. The complementary interval is continuous at least either before or after the standard interval and has a distance approximately equal to a multiple of the length of the standard interval by a natural number. The specific light source is determined by the locations of the non-light emitting light sources. The exposed area is formed by the exposure controller causing the specific light source to emit exposure light according to the channel-by-channel exposure data while causing the transport unit to move the exposure head through the standard interval and through the complementary interval.

Accordingly, even if the plurality of light sources include some non-light emitting light sources due to breakage or the like, image recording can be performed continuously without halting the system until the next change of the light sources.

An object of the invention is thus to provide an exposure system in which a plurality of laser diodes are located at dispersed sites, and which system allows its continuous use even if some of the laser diodes are in the non-light emitting state due to breakage or the like.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view showing the main operating units of a CTP system 100 according to a first preferred embodiment;

FIG. 6 shows the relationship among the section of head movement, the light-emitting/non-light emitting state of a laser diode 31 on each channel, and the contents of image recording on each channel, in normal mode;

FIGS. 7A to 7C show by way of example the relationship between the light-emitting/non-light emitting state of each channel and the contents of image recording on each channel, in a first mode for the presence of (a) non-light emitting channel(s);

FIGS. 8A and 8B show by way of example the relationship between the light-emitting/non-light emitting state of each channel and the contents of image recording on each channel, in a second mode for the presence of non-light emitting channels;

FIG. 9 shows by way of example the relationship between the light-emitting/non-light emitting state of each channel and the contents of image recording on each channel, in the second mode for the presence of non-light-emitting channels;

FIGS. 10A to 10D show by way of example the relationship between the light-emitting/non-light emitting state of each channel and the contents of image recording on each channel, in a third mode for the presence of non-light emitting channels;

FIG. 11 shows by way of example the relationship between the light-emitting/non-light emitting state of each channel and the contents of image recording on each channel, in the third mode for the presence of non-light emitting channels;

FIGS. 12A and 12B show alternative examples;

FIG. 13 shows the relationship among the section of head movement, the light-emitting/non-light emitting state of the laser diode 31 on each channel, and the contents of image recording on each channel, in normal mode, according to a second preferred embodiment;

FIGS. 14A to 14C show by way of example the relationship between the light-emitting/non-light emitting state of each channel and the contents of image recording on each channel, in a mode for the presence of (a) non-light emitting channel(s);

FIG. 15 shows the relationship among the section of head movement, the light-emitting/non-light emitting state of the laser diode 31 on each channel, and the contents of image recording on each channel, in normal mode, according to a third preferred embodiment; and FIGS. 16A to 16C show by way of example the relationship between the light-emitting/non-light emitting state of each channel and the contents of image recording on each channel, in a mode for the presence of non-light emitting channels arranged in patterns characteristic of the third preferred embodiment.

DESCRIPTION OF THE PREFERRED EMBODIMENTS

First Preferred Embodiment

<System Overview>

Figure 2:
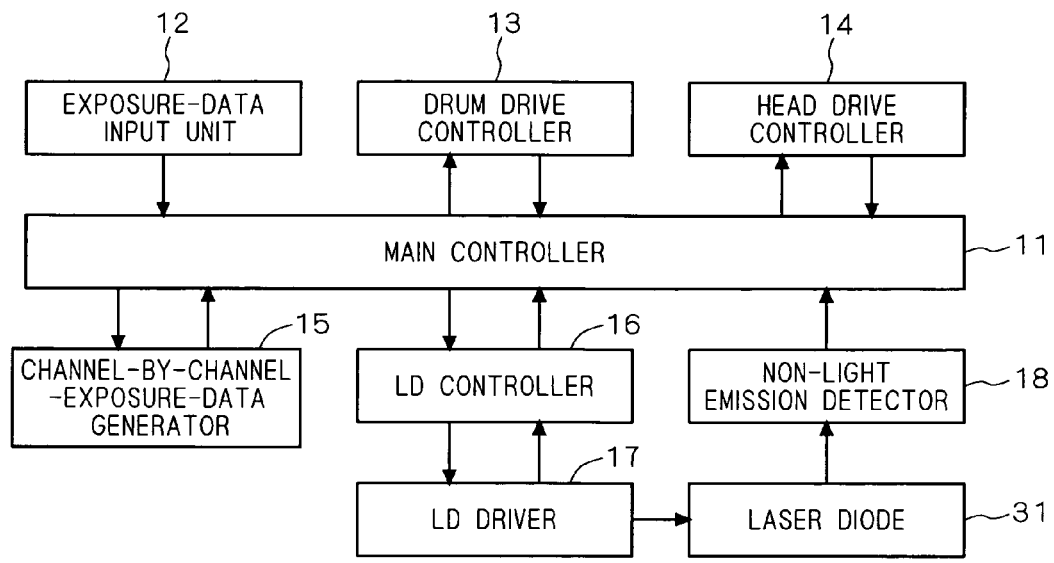
FIG. 2 is a schematic block diagram of elements relating to operation control of the CTP system 100.

FIG. 1 is a perspective view showing the main operating units of a CTP system 100 according to a first preferred embodiment of the invention. The CTP system 100 is a system in which the surface of a printing plate P which is a recording material mounted on the side of a drum 1 is irradiated with laser beams emitted from laser sources which are mounted in an exposure head 5 and on-off controlled pixel by pixel based on given exposure data, so that a sensitive material on the surface of the printing plate P as a recording material is exposed thereby to form an exposed image. That is, the CTP system 100 serves as an exposure system. In particular, the CTP system 100 according to this preferred embodiment is, as will be described later, configured to simultaneously emit laser beams from N laser diodes 31 (where N is a natural number) located at dispersed sites at regular intervals so as to simultaneously expose a plurality of partial areas (small images) and ultimately to form one exposed image (large image) on approximately the entire surface of the printing plate P.

The drum 1 is a cylindrical member that is driven by a drum driver 6 (e.g., a drive motor) to rotate on its rotation axis AX.

The exposure head 5 is configured such that N LD units 30 are located at dispersed sites at regular intervals w along a direction parallel to the rotation axis AX. The LD units 30 each include a laser diode (LD) 31 as a laser source. In other words, the exposure head 5 includes N laser diodes 31. The CTP system 100 according to this preferred embodiment includes no lens nor calibration sensor between the laser diodes 31 and the drum 1 (or the printing plate P around the drum 1). Thus, light emitted from the laser diodes 31 is directly applied to the printing plate P.

The exposure head 5 is guided in a direction (sub-scanning direction) parallel to the rotation axis AX along an exposure head guide not shown by operation of a head-moving ball screw 3 and a head-moving motor 4.

The CTP system 100 according to this preferred embodiment ensures a distance ky that is k times the intervals w of the laser diodes 31 (where k is a natural number not less than two) for the moving range of the exposure head 5. Here, the value k can be determined as appropriate according to the mode of processing for the case of the presence of a non-light emitting laser diode 31, but practically the value k is equal to either three or four.

In this preferred embodiment, the N laser diodes 31 mounted in the exposure head 5 shall be referred to as the laser diode 31 on channel 1 (1ch), the laser diode 31 on channel 2 (2ch), . . . and the laser diode 31 on channel N (Nch), or simply referred to as 1ch, 2ch, . . . and Nch, in order of location from one to the other end of the exposure head 5. Further, the light-emitting/non-light emitting state of the laser diode 31 on each channel may also be referred to as the light-emitting/non-light emitting state of each channel.

FIG. 2 is a schematic block diagram of the elements relating to operation control of the CTP system 100. The CTP system 100 further includes a main controller 11, an exposure-data input unit 12, a drum drive controller 13, a head drive controller 14, a channel-by-channel-exposure-data generator 15, an LD controller 16, an LD driver 17, and a non-light-emission detector 18.

The main controller 11 includes, for example, a CPU, a ROM, a RAM, and the like which are not shown, and exercises centralized control over general operation of the CTP system 100. The exposure-data input unit 12 acquires exposure data that describes on/off information of laser lights during exposure (i.e., the information corresponds to binary information on an exposed image). During normal operation, one exposure data is given for an exposed image (large image) to be formed on a single printing plate P. The drum drive controller 13 controls rotation of the drum 1 by the drum driver 6. The head drive controller 14 controls operation of the head-moving ball screw 3 and the head-moving motor 4. The channel-by-channel-exposure-data generator 15 generates, based on the contents of description of exposure data acquired by the exposure-data input unit 12, channel-by-channel exposure data that describes the contents of on/off operation of a laser beam by the laser diode 31 on each channel. In other words, the contents of exposure data is allocated to N channels. The LD controller 16 applies power voltage with a given voltage value to the LD driver 17 according to the channel-by-channel exposure data so as to control light emission of the laser diodes 31 by the LD driver 17. The LD driver 17 applies to the laser diodes 31 operating current with a given current value that is responsive to the power voltage applied from the LD controller 16, thereby to cause light emission by the laser diodes 31.

In the CTP system 100 described here, the main controller 11 that stores the channel-by-channel exposure data beforehand gives certain control instructions to the drum drive controller 13, the head drive controller 14, and the LD controller 16, so as to move the exposure head 5 in the sub-scanning direction in synchronization with rotation of the drum 1 as well as to cause laser-beam emission by the laser diodes 31 in conjunction with on/off timing responsive to the contents of description of the channel-by-channel exposure data. This achieves formation of an exposed image on the printing plate P held by the drum 1.

Further in the CTP system 100, the non-light-emission detector 18 monitors the states of the laser diodes 31, and when it detects that any of the laser diodes is in the non-light emitting state, it transmits a signal indicating the result of detection to the main controller 11. In the CTP system 100, in the case where light emission by the laser diodes 31 fails to provide a given amount of light at the time when the operating current with a given current value or more is applied to the laser diodes 31, the laser diodes 31 are determined as being in the non-light emitting state. More specifically, the non-light-emission detector 18 monitors the current value of the operating current that is output from the LD driver 17 to the laser diodes 31, and when the current value reaches a certain value, a certain detection signal is given to the main controller 11.

<Basic Operation for Image Recording>

Figure 3:
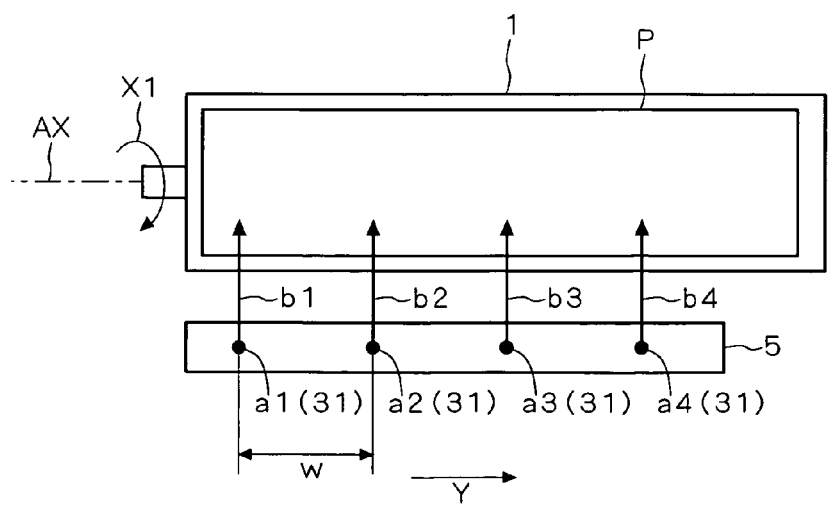
FIGS. 3 and 4 are explanatory diagrams for explaining the basic operation of the CTP system 100 for image recording.
Figure 4:
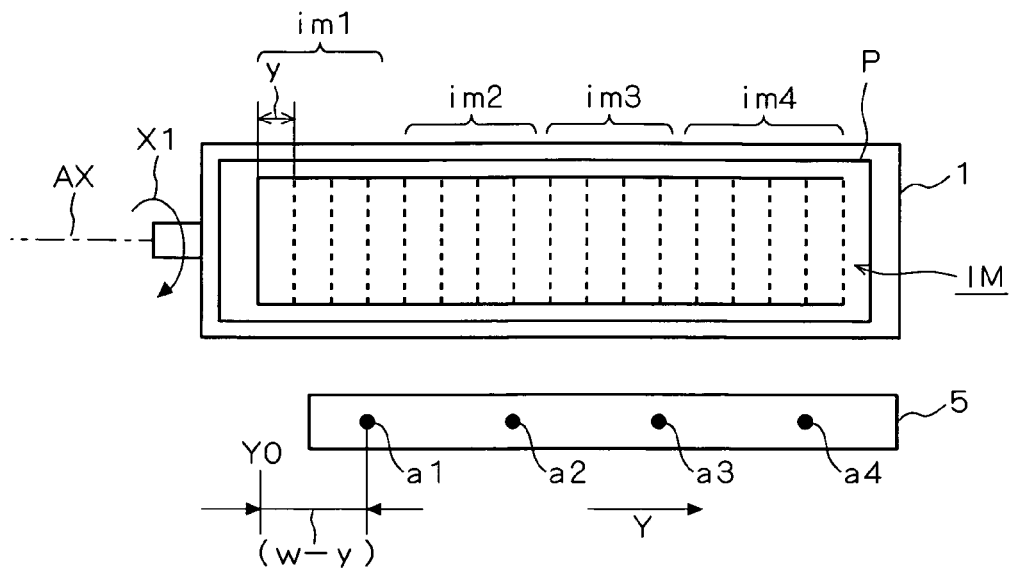

FIGS. 3 and 4 are explanatory diagrams for explaining the basic operation of the CTP system 100 for image recording. For ease of description, FIGS. 3 and 4 show an example where, in the exposure head 5, four laser diodes 31 on channels a1 to a4 are spaced at regular intervals w in parallel with the rotation axis AX (i.e., where N=4). It is assumed that the main controller 11 has previously caused the channel-by-channel-exposure-data generator 15 to generate channel-by-channel exposure data based on exposure data acquired by the exposure-data input unit 12, and it stores the same. The contents described here is equivalent to reference image recording described later.

First, the drum drive controller 13 drives the drum driver 6 to rotate the drum 1 on the rotation axis AX in a direction X1 (main scanning direction) at a given speed, and in synchronization with that rotation, the head drive controller 14 moves the exposure head 5 in the sub-scanning direction (Y direction) parallel to the rotation axis AX at such a speed that the exposure head 5 is moved by a distance y with a single rotation of the drum 1. Here, the equation w=my shall be satisfied (m is a natural number not less than two).

The LD controller 16 applies power voltage with a given voltage value to the LD driver 17 in conjunction with on/off timing based on the contents of description of the channel-by-channel exposure data, so that the operating current with a given current value that is enough to induce a necessary amount of laser light emission for exposure is applied to the laser diodes 31 on channels a1 to a4 which, then, respectively emit light beams (exposure light) b1 to b4.

Accordingly, every time the drum 1 makes one rotation, laser beams emitted from the laser diodes 31 on channels a1 to a4 produce an exposed image with a pitch of y (that is equivalent to the inverse of resolution in the sub-scanning direction) according to the channel-by-channel exposure data. Continuation of the rotation of the drum 1, the movement of the exposure head 5, and the emission of laser beams results in, as shown in FIG. 4, formation of exposed images (small images) on small-image areas im1 to im4. Image recording is completed when the exposure head 5 is moved in the sub-scanning direction by a distance (m−1)y=w−y from its original position Y0. The condition achieved at this time is such that small images formed on the small-image areas im1 to im4 aligned in the Y or sub-scanning direction are adjacent to one another in sequence. Thus, as a whole, image recording of a single exposed image IM is completed.

Since w=my, the pitch of all the scanning lines, including those formed by laser beams of different laser diodes 31, is constant at y. From this, there is little likelihood that the spacing between the small images formed on the small-image areas im1 to im4 will be recognized, and therefore that a single exposed image (large image) IM will be recognized as consisting of a plurality of small images.

<Image Recording>

Next described are concrete modes of image recording performed by the CPT system 100. This preferred embodiment is characterized in that, even if some of the laser diodes 31 in the exposure head 5 are in the non-light emitting state, image recording within a given range can be performed continuously.

Figure 5:
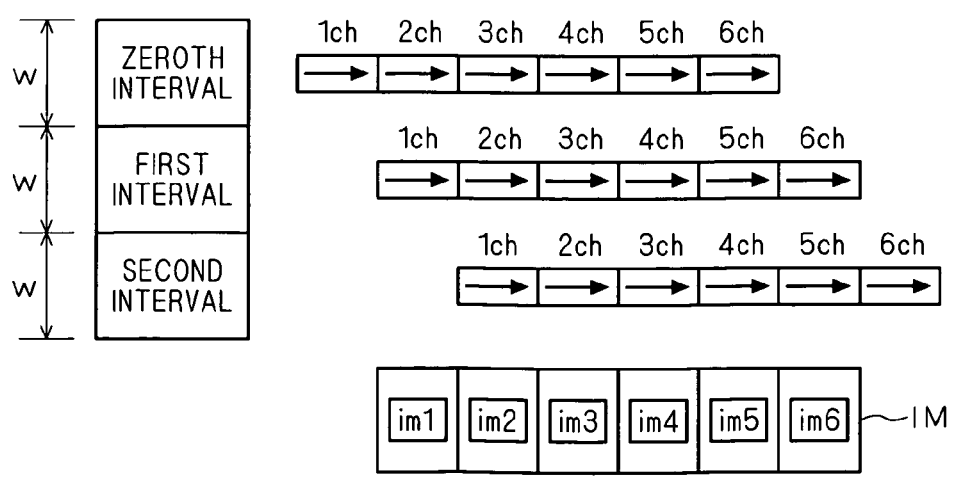
FIG. 5 shows the relationship between the position of an exposure head 5 and small images recorded by exposure.

FIG. 5 shows the relationship between the position of the exposure head 5 and small images to be recorded by exposure. The following description is given for the case where k=3, i.e., where the exposure head 5 can be moved by a distance three times the intervals w of the laser diodes 31. To be more precise, as shown in FIG. 5, the exposure head 5 can be moved through a zeroth interval, a first interval, and a second interval, each interval having the same distance w. That is, the exposure head 5 can be moved by a total distance of 3w.

The following describes the case where N=6, i.e., where there are six laser diodes 31 on 1ch to 6ch and a whole exposed image (large image) IM is recorded, consisting of small images formed on six small-image areas im1 to im6.

FIG. 5 further shows a correspondence (a channel vs. small image area correspondence) between the interval of movement of the exposure head 5 and the small-image areas on which small images are formed by laser beam emission from the channels.

In this preferred embodiment, in the case where the laser diodes 31 are all in the proper light emitting state, the exposure head 5 needs to be moved through only the first interval in order to complete image recording. Hereinafter, the first interval is also referred to as a "standard interval," and image recording performed in the standard interval is also referred to as "standard image recording."

More specifically, standard image recording is equivalent to the mode in which the laser diodes 31 on 1ch, 2ch, 3ch, 4ch, 5ch, and 6ch perform image recording on the small-image areas im1, im2, im3, im4, im5, and im6, respectively. In other words, the standard image recording is such that image recording performed by the laser diode 31 on each channel during the standard interval is targeted for the small-image area with the same number.

On the other hand, the zeroth interval and the second interval are, as will be described later, used in the case of the presence of a non-light emitting laser diode 31. For example, referring to the case where the exposure head 5 is moved through the second interval, the laser diode 31 on 1ch can perform image recording on the small-image area im2, and the laser diode 31 on 5ch can perform image recording on the small-image area im6. Since the zeroth interval is the interval that the exposure head 5 is moved therethrough before it is moved through the first interval which is the standard interval, it is referred to as a "pre-complementary interval." And, since the second interval is the interval that the exposure head 5 is moved therethrough after it is moved through the first interval, i.e., the standard interval, it is referred to as a "post-complementary interval." These complementary intervals are before and after and continuous to the standard interval.

<Normal Mode>

First, a mode (normal mode) for the case where the laser diodes 31 in the exposure head 5 are all in the proper light-emitting state. FIG. 6 shows the relationship among the interval of head movement, the light-emitting/non-light emitting states of the laser diodes 31 on 1ch to 6ch, and the contents of image recording on each channel, in the normal mode. In FIG. 6 and later figures, the down arrow in the item of "Interval of Head Movement" indicates that the exposure head 5 is moved through that interval, while the sign X indicates that the exposure head 5 is not moved through that interval. In the item of "Object Recorded on Each Channel," the reference characters of the small-image areas, e.g., im1, enclosed in a box indicate that image recording is performed on those small-image areas by the laser diodes 31 on the corresponding channels, while the sign X indicates that image recording is not performed.

In the normal mode, all the channels are in the light-emitting state, so that the non-emission detector 18 does not give a detection signal for identification of a non-light emitting laser diode 31 to the main controller 11. In this case, only the standard image recording described above should be performed. Thus, based on exposure data, the channel-by-channel-exposure-data generator 15 generates channel-by-channel exposure data that describes the allocation of the contents of image recording to each channel for standard image recording. For image recording according to the channel-by-channel exposure data, the main controller 11 gives certain control instructions to the drum drive controller 13, the head drive controller 14, and the LD controller 16, which controllers then control their respective objects of control in response to the control instructions, thereby achieving image recording.

<First Mode for the Presence of Non-Light Emitting Channel>

Next, the modes of processing for the cases of the presence of a non-light-emitting laser diode 31 (i.e., the presence of a non-light-emitting channel) are described in sequence for each pattern of the location of a non-light emitting channel.

In any case, the channel-by-channel-exposure-data generator 15 generates channel-by-channel exposure data corresponding to each pattern, and for image recording according to the channel-by-channel exposure data, the main controller 11 gives certain control instructions to the drum drive controller 13, the head drive controller 14, and the LD controller 16 which controllers then control their respective objects of control in response to the control instructions, thereby achieving image recording.

FIGS. 7A to 7C show by way of example the relationship between the light-emitting/non-light emitting state of each channel and the contents of image recording on each channel, in a first mode for the presence of a non-light emitting channel. In FIGS. 7A to 7C and later figures, the small-image areas enclosed in a double box are those on which the laser diode 31 on each channel performs image recording during a period other than the period of the standard interval.

FIG. 7A shows the case where any one of even-numbered channels (2ch in this case) is in the non-light emitting state. In this case, image recording is performed by use of only odd-numbered channels.

To be specific, the exposure head 5 is moved through the first interval and through the second interval, and the laser diodes 31 on the odd-numbered channels perform image recording on two continuous small-image areas. More specifically, in the case of FIG. 7A, the channel-by-channel-exposure-data generator 15 generates channel-by-channel exposure data describing the way that the laser diodes 31 on 1ch, 3ch, and 5ch should perform image recording (standard image recording) on the small-image areas im1, im3, and im5, respectively, during the period when the exposure head 5 is moved through the first, i.e., standard interval, and subsequently, they should perform image recording on the small-image areas im2, im4, and im6, respectively, during the period when the exposure head 5 is moved through the second, i.e., post-complementary interval. This is equivalent to the fact that the channel-by-channel-exposure-data generator 5 allocates to 1ch, 3ch, and 5ch, the contents of image recording on the small-image areas im2, im4, and im6 that should be, in the normal mode, performed by the laser diodes 31 on 2ch, 4ch, and 6ch, respectively.

Strictly speaking, image recording for each interval is completed by the exposure head 5 moving only a distance of w−y in each interval. However, in order to move to the next interval, the exposure head 5 needs to move further by a distance y to reach the starting position of the next interval. For ease of understanding, the description hereinafter is given on the assumption that image recording is performed by the exposure head 5 moving only a distance w in each interval.

Although not shown, in the case where any one of the odd-numbered channels is in the non-light emitting state, the laser diodes 31 on the even-numbered channels should perform image recording on two continuous small-image areas during the period when the exposure head 5 is moved in succession through the zeroth, i.e., pre-complementary interval and through the first, i.e., standard interval.

Further, as shown in FIGS. 7B and 7C, in the cases where non-light emitting laser diodes 31 are only either on the odd-numbered channels or on the even-numbered channels, image recording can be performed in the same way as described above, irrespective of the number of non-light emitting laser diodes 31 (even if all the laser diodes 31 on the odd-numbered channels or all the laser diodes 31 on the even-numbered channels are in the non-light emitting state).

In other words, in the cases where the detection result of the non-light-emission detector 18 shows that only even-numbered channels or only odd-numbered channels are in the non-light emitting state, the channel-by-channel-exposure-data generator 15 generates channel-by-channel exposure data describing the way that exposure should be performed by use of only either odd-numbered or even-numbered channels.

By performing image recording according to the channel-by-channel exposure data while moving the exposure head 5 not only through the standard interval but also through either the pre-complementary or the post-complementary interval, even if non-light emitting laser diodes 31 are located in such patterns as described above, image recording can be performed continuously without halting the system until the next change of the laser diodes 31.

<Second Mode for the Presence of Non-light Emitting Channel>

FIGS. 8A and 8B and FIG. 9 show by way of example the relationship between the light-emitting/non-light emitting state of each channel and the contents of image recording on each channel, in a second mode for the presence of non-light emitting channels. FIGS. 8A and 8B and FIG. 9 show the cases where non-light emitting laser diodes 31 include both those on even-numbered channels and those on odd-numbered channels, and none of the non-light emitting laser diodes 31 are adjacent to each other.

In the above cases, as a general rule, the laser diode 31 on a channel whose channel number is smaller by one than a non-light emitting channel (the next left one in the case of FIG. 8A) should perform image recording on a small-image area that should originally (in the normal mode) be subjected to image recording by the laser diode 31 on the non-light emitting channel, during the period when the exposure head 5 is moved through the second, i.e., post-complementary interval.

For example, in the case as shown in FIG. 8A where 2ch and 5ch are in the non-light emitting state, firstly, the laser diodes 31 on 1ch, 3ch, 4ch, and 6ch perform image recording on the small-image areas im1, im3, im4, and im6, respectively, during the period when the exposure head 5 is moved through the first interval; and subsequently, the laser diodes 31 on 1ch and 4ch perform image recording on the small-image areas im2 and im5, respectively, during the period when the exposure head 5 is moved through the second interval.

However, this rule cannot be applied to the case as shown in FIG. 8B where 1ch is in the non-light emitting state. In this case, a small-image area that should originally be subjected to image recording by a laser diode 31 on the non-light emitting channel is subjected to image recording by a laser diode 31 whose channel number is larger by one than the non-light emitting channel (the next right one in the case of FIG. 8B), during the period when the exposure head 5 is moved through the zeroth, i.e., the pre-complementary interval.

For example, in the case as shown in FIG. 8B where 1ch and 4ch are in the non-light emitting state, firstly, the laser diodes 31 on 2ch and 5ch perform image recording on the small-image areas im1 and im4, respectively, during the period when the exposure head 5 is moved through the zeroth interval, and subsequently, the laser diodes 31 on 2ch, 3ch, 5ch, and 6ch perform image recording on the small-image areas im2, im3, im5, and im6, respectively, during the period when the exposure head 5 is moved through the first interval.

In the case as shown in FIG. 9 where only the channels at both ends of the exposure head 5, namely 1ch and Nch (6ch in the case of FIG. 9), are in the non-light emitting state, image recording by use of only either one of the left and right next channels is impossible for the above two non-light emitting channels. In this case, exceptionally, the exposure head 5 is move through the zeroth, i.e., pre-complementary interval, during which period the laser diode 31 on 2ch performs image recording on the small-image area im1, and subsequently, the exposure head 5 is moved through the first interval, during which period the laser diodes 31 on 2ch, 3ch, 4ch, and 5ch perform image recording on the small-image areas im2, im3, im4, and im5, respectively. The exposure head 5 is further subsequently moved through the second, i.e., post-complementary interval, during which period the laser diode 31 on 5ch performs image recording on the small-image area im6.

At any rate, in the cases where the detection result of the non-light-emission detector 18 shows that non-light emitting laser diodes 31 include both those on even-numbered channels and those on odd-numbered channels, and none of the non-light emitting laser diodes 31 are adjacent to each other, the channel-by-channel-exposure-data generator 15 generates channel-by-channel exposure data describing the way that a laser diode 31 on either the next left or the next right channel of the non-light emitting channel should perform image recording on a small-image area that should originally be subjected to image recording by the laser diode 31 on the non-light emitting channel.

By performing image recording according to the channel-by-channel exposure data while moving the exposure head 5 not only through the standard interval but also through at least either one of the pre-complementary and post-complementary intervals, even if non-light emitting laser diodes 31 are located in such patterns as described above, image recording can be performed continuously without halting the system until the next change of the laser diodes 31.

<Third Mode for the Presence of Non-light Emitting Channel>

FIGS. 10A to 10D and FIG. 11 show by way of example the relationship between the light-emitting/non-light emitting state of each channel and the contents of image recording on each channel, in a third mode for the presence of non-light emitting channel. FIGS. 10A to 10D and FIG. 11 show the cases where non-light emitting laser diodes 31 include both those on even-numbered channels and those on odd-numbered channels, and any two non-light emitting channels are adjacent to each other.

In the above cases, a light-emitting laser diode 31 next to a non-light emitting laser diode 31 on the other side performs image recording on a small-image area that should originally (in the normal mode) be subjected to image recording by the non-light emitting laser diode 31 whose next channel is also in the non-light emitting state.

For example, in the case as shown in FIG. 10A where 2ch and 3ch are in the non-light emitting state, the laser diodes 31 on the adjacent channels, 1ch and 4ch, should perform image recording on the small-image areas im2 and im3, respectively.

More specifically, firstly, the exposure head 5 is moved through the zeroth interval, during which period the laser diode 31 on 4ch performs image recording on the small-image area im3, and subsequently, the exposure head 5 is moved through the first interval, during which period the laser diodes 31 on 1ch, 4ch, 5ch, and 6ch perform image recording on the small-image areas im1, im4, im5, and im6, respectively. The exposure head 5 is further subsequently moved through the second interval, during which period the laser diode 31 on 1ch performs image recording on the small-image area im2.

Similarly, in the case as shown in FIG. 10B where 3ch and 4ch are in the non-light emitting state, the laser diodes 31 on the adjacent channels, 2ch and 5ch, should perform image recording on the small-image areas im3 and im4, respectively.

More specifically, firstly, the exposure head 5 is moved through the zeroth interval, during which period the laser diode 31 on 5ch performs image recording on the small-image area im4, and subsequently, the exposure head 5 is moved through the first interval, during which period the laser diodes 31 on 1ch, 2ch, 5ch, and 6ch perform image recording on the small-image areas im1, im2, im5, and im6, respectively. The exposure head 5 is further subsequently moved through the second interval, during which period the laser diode 31 on 2ch performs image recording on the small-image area im3.

In the cases as shown in FIGS. 10C and 10D and FIG. 11 where there is a non-light emitting channel that is adjacent to none of other non-light emitting channels, in addition to the presence of non-light emitting channels adjacent to each other, a small-image area that should originally be subjected to image recording by such a channel should be performed in the same way as described above (the second mode).

For example, in the case as shown in FIG. 10C where 5ch, in addition to 2ch and 3ch adjacent to each other, are in the non-light emitting state, the laser diode 31 on 4ch should perform image recording on the small-image area im5.

More specifically, firstly, the exposure head 5 is moved through the zeroth interval, during which period the laser diode 31 on 4ch performs image recording on the small-image area im3, and subsequently, the exposure head 5 is moved through the first interval, during which period the laser diodes 31 on 1ch, 4ch, and 6ch perform image recording on the small-image areas im1, im4, and im6, respectively. The exposure head 5 is further subsequently moved through the second interval, during which period the laser diodes 31 on 1ch and 4ch perform image recording on the small-image areas im2 and im5, respectively.

In the case as shown in FIG. 10D where 1ch, in addition to 4ch and 5ch adjacent to each other, are in the non-light emitting state, the laser diode 31 on 2ch should perform image recording on the small-image area im1.

More specifically, firstly, the exposure head 5 is moved through the zeroth interval, during which period the laser diodes 31 on 2ch and 6ch perform image recording on the small-image areas im1 and im5, respectively, and subsequently, the exposure head 5 is moved through the first interval, during which period the laser diodes 31 on 2ch, 3ch, and 6ch perform image recording on the small-image areas im2, im3, and im6, respectively. The exposure head 5 is further subsequently moved through the second interval, during which period the laser diode 31 on 3ch performs image recording on the small-image area im4.

Further, in the case as shown in FIG. 11 where two adjacent channels (3ch and 4ch) are in the non-light emitting state and the channels at both ends (1ch and 6ch or Nch) of the exposure head 5 are also in the non-light emitting state, the exposure head 5 is first moved through the zeroth interval, during which period the laser diodes 31 on 2ch and 5ch perform image recording on the small-image areas im1 and im4, respectively, and subsequently, the exposure head 5 is moved through the first interval, during which period the same laser diodes 31 on 2ch and 5ch again perform image recording on the small-image areas im2 and im5, respectively. The exposure head 5 is further subsequently moved through the second interval, during which period the same laser diodes 31 on 2ch and 5ch still again perform image recording on the small-image areas im3 and im6, respectively.

At any rate, in the cases where the detection result of the non-light-emission detector 18 shows that non-light emitting laser diodes 31 include both those on even-numbered channels and those on odd-numbered channels, and any two non-light emitting channels are adjacent to each other, the channel-by-channel-exposure-data generator 15 generates channel-by-channel exposure data describing the way that a light-emitting laser diode 31 adjacent to the non-light emitting laser diode 31 on the other side should perform image recording on a small-image area that should originally be subjected to image recording by a non-light emitting laser diode 31 whose next channel is also in the non-light emitting state.

Further in the case where there is a non-light emitting channel that is adjacent to none of other non-light emitting channels in addition to the presence of non-light emitting channels adjacent to each other, channel-by-channel exposure data is generated to describe the way that the same processing as described above (second mode) should be performed.

By performing image recording according to the channel-by-channel exposure data while moving the exposure head 5 not only through the standard interval but also through both the pre-complementary and the post-complementary intervals, even if non-light emitting laser diodes 31 are located in such patterns as described above, image recording can be performed continuously without halting the system until the next change of the laser diodes 31.

<Alternative Examples of Third Mode>

In the case where non-light emitting channels detected are located in such patterns as shown in FIGS. 10A and 10B, image recording can be performed with a smaller number of channels. FIGS. 12A and 12B explain this.

FIG. 12A shows a different mode of image recording for the case where 2ch and 3ch are detected as being in the non-light emitting state as in the case of FIG. 10A.

More specifically, the exposure head 5 is first moved through the zeroth interval, during which period the laser diode 31 on 4ch performs image recording on the small-image area im3, and subsequently, the exposure head 5 is moved through the first interval, during which period the laser diodes 31 on 1ch, 4ch, and 6ch perform standard image recording. The exposure head 5 is further subsequently moved through the second interval, during which period the laser diodes 31 on 1ch and 4ch perform image recording on the small-image areas im2 and im5, respectively.

The above case is different from the case of FIG. 10A in not using the laser diode 31 on 5ch that can be used for image recording. The example of FIG. 12A takes the advantage of the necessity for moving the exposure head 5 through the second, i.e., post-complementary interval in order for 1ch to perform image recording on the small-image area im2. That is, the laser diode 31 on 4ch, which performs image recording on the small-image areas im3 and im4 during the period of the zeroth and the first interval, is also used for image formation on the small-image area im5 during the period of the second interval.

Similarly, FIG. 12B shows a different mode of image recording for the case where 3ch and 4ch are in the non-light emitting state as in the case of FIG. 10B.

More specifically, the exposure head 5 is first moved through the zeroth interval, during which period the laser diode 31 on 5ch performs image recording on the small-image area im4, and subsequently, the exposure head 5 is moved through the first interval, during which period the laser diodes 31 on 1ch, 2ch, and 5ch perform standard image recording. The exposure head 5 is further subsequently moved through the second interval, during which period the laser diodes 31 on 2ch and 5ch perform image recording on the small-image areas im3 and im6, respectively.

The above case is different from the case of FIG. 10B in not using the laser diode 31 on 6ch that can be used for image recording. The example of FIG. 12B takes the advantage of the necessity for moving the exposure head 5 through the second, i.e., post-complementary interval in order for 2ch to perform image recording on the small-image area im3. That is, the laser diode 31 on 5ch, which performs image recording on the small-image areas im4 and im5 during the period of the zeroth and the first intervals, is also used for image formation on the small-image area im6 during the period of the second interval.

In those modes described above, although the travel distance of the exposure head 5 itself remains the same as in the cases of FIGS. 10A and 10B, there is an advantage of reducing the number of laser diodes 31 to be used for light emission.

<Cases where Continuous Image Recording is Difficult>

As described above, even in the cases where there are two non-light-emitting channels to each other, image recording can be performed by use of light-emitting laser diodes 31 on their adjacent channels. In other words, according to this preferred embodiment, continuous image recording is difficult to perform, in principle, only when there are three or more non-light emitting channels adjacent to one another. But, exceptionally in the case where there are two adjacent non-light emitting channels at either end of the exposure head 5, continuous image recording is also difficult to perform.

However, such a pattern of appearance of non-light emitting channels is practically very rare in CTP systems that include laser diodes on the order of several tens to a hundred. Thus, according to this preferred embodiment, even at the appearance of non-light emitting channels under normal use, image recording can be performed continuously by using any one of the modes described above.

Second Preferred Embodiment

While the first preferred embodiment described above is given on the assumption that image recording is performed regarding the first interval as the standard interval, the modes of image recording in the CTP system 100 are not only limited thereto.

FIG. 13 shows the relationship among the interval of head movement, the light-emitting/non-light emitting state of the laser diode 31 on each channel, and the contents of image recording on each channel, in normal mode according to this preferred embodiment.

In the CTP system 100 according to this preferred embodiment, the movable range of the exposure head 5 is determined so that, in the normal mode, image recording is performed by the exposure head 5 moving through only the zeroth interval. In other words, the zeroth interval is referred to as the standard interval, and image recording performed during the period when the exposure head 5 is moved through the zeroth interval is referred to as "standard image recording." Thus, the first and the second intervals are referred to as "post-complementary intervals."

FIGS. 14A to 14C show by way of example the relationship between the light-emitting/non-light emitting state of each channel and the contents of image recording in the case of the presence of non-light emitting channels.

In this preferred embodiment, as a general rule, in the case of the presence of a non-light-emitting channel, channel-by-channel exposure data is generated to describe the way that a laser diode whose channel is smaller than and immediately adjacent to the non-light emitting channel should perform image recording on a small-image area that should originally be subjected to image recording by the laser diode 31 on the non-light emitting channel.

For example, in the case as shown in FIG. 14A where 2ch is in the non-light emitting state, the laser diodes 31 on 1ch, 3ch, 4ch, 5ch, and 6ch perform standard image recording during the period when the exposure head 5 is moved through the zeroth, i.e., standard interval. Then, the exposure head 5 is further moved through the first, i.e., post-complementary interval, during which period the laser diode 31 on 1ch, whose channel number is smaller by one than 2ch, performs image recording on the small-image area im2.

In the case as shown in FIG. 14B where 3ch and 5ch are in the non-light emitting state, the laser diodes 31 on 1ch, 2ch, 4ch, and 6ch perform standard image recording during the period when the exposure head 5 is moved through the zeroth, i.e., standard interval. Then, the exposure head 5 is further moved through the first, i.e., post-complementary interval, during which period the laser diodes. 31 on 2ch and 4ch perform image recording on the small-image areas im3 and im5, respectively.

Further, in the case as shown in FIG. 14C where 5ch and 6ch are in the non-light emitting state, the laser diodes 31 on 1ch, 2ch, 3ch, and 4ch perform standard image recording during the period when the exposure head 5 is moved through the zeroth, i.e., standard interval. Then, the exposure head 5 is further moved through the first interval and then through the second interval, i.e., through the post-complementary intervals, during which period the laser diode 31 on 4ch performs image recording on the small-image areas im5 and im6 in sequence. Such a mode of image recording is possible because there are two post-complementary intervals, namely the first and the second intervals, in this preferred embodiment.

Thus, this preferred embodiment also allows continuous image recording even in the case where there are two non-light emitting channels adjacent to each other. Thus, according to this preferred embodiment, continuous image recording is difficult to perform, in principle, only when there are three or more non-light emitting channels adjacent to one another. But, exceptionally in the case where 1ch is in the non-light emitting state, continuous image recording is also difficult to perform.

However, such a pattern of appearance of non-light emitting channels is practically very rare in CTP systems. Thus, according to this preferred embodiment, even at the appearance of non-light emitting channels under normal use, image recording can be performed continuously by using any one of the modes described above.

Third Preferred Embodiment

In the first preferred embodiment described above, the exposure head 5 is moved within the range of three intervals (distance 3w), namely the zeroth, the first, and the second intervals, and image recording is performed regarding the first interval as the standard interval. However, the mode of movement of the exposure head 5 in the CTP system 100 is not only limited thereto.

FIG. 15 shows the relationship among the interval of head movement, the light-emitting/non-light emitting state of each channel, and the contents of image recording on each channel, in normal mode according to this preferred embodiment.

As shown in FIG. 15, the CTP system 100 according to this preferred embodiment resembles that of the first preferred embodiment in that image recording is performed regarding the first interval as the standard interval, but differs in that a third interval is added after the second interval as a post-complementary interval. That is, in the CTP system 100 of this preferred embodiment, k=4, i.e., the exposure head 5 is moved within the range of a distance 4w.

As previously described, this preferred embodiment also regards the first interval as the standard interval and includes the zeroth and the second intervals. Thus, as in the first preferred embodiment, image recording by use of only those intervals is possible. The description thereof is omitted herein.

FIGS. 16A to 16C show the relationship between the light-emitting/non-light emitting state of each channel and the contents of image recording on each channel, in the cases where non-light emitting channels are located in patterns characteristic of this preferred embodiment.

FIG. 16A shows the case where non-light emitting channels are located in the same pattern as in the case of FIG. 10C according to the first preferred embodiment.

In this preferred embodiment, in the case as shown in FIG. 16A where two non-light emitting channels are adjacent to each other (2ch and 3ch in the case of FIG. 16A), channel-by-channel exposure data is generated to describe the way that a laser diode 31 whose channel number (1ch in the case of FIG. 16A) is smaller than and immediately adjacent to the non-light emitting channels should perform image recording on a small-image area that should originally be subjected to image recording by the laser diode 31 on the non-light emitting channels.

In the case of FIG. 16A, since 5ch, in addition to 2ch and 3ch, are in the non-light emitting state, the laser diodes 31 on 1ch and 4ch perform standard image recording during the period when the exposure head 5 is moved through the first, i.e., standard interval. Then, the exposure head 5 is further moved through the second interval and then through the third interval, i.e., through the post-complementary intervals, during which period the laser diode 31 on 1ch performs image recording on the small-image areas im2 and im3 in sequence and the laser diode 31 on 4ch performs image recording on the small-image areas im5 and im6 in sequence.

In the case of FIG. 16A, 6ch may be used for standard image recording because 6ch is in the light-emitting state. However, since the exposure head 5 needs to be moved through the third interval in order for 1ch to perform image recording on the small-image area im3, and the travel distance of the exposure head 5 remains unchanged irrespective of the use or non-use of 6ch, it can be said that the mode shown in FIG. 16A is more preferable because of a reduced number of laser diodes 31 to be used for light emission.

This preferred embodiment allows continuous image recording even in the case where three non-light emitting channels are adjacent to one another, which cannot be achieved by the first preferred embodiment. FIGS. 16B and 16C show the examples.

In the above case, speaking of two non-light emitting channels with lower numbers out of three continuous non-light emitting channels, a laser diode 31 whose channel number is smaller than and immediately adjacent to those two non-light emitting channels should perform image recording on small-image areas that should originally be subjected to image recording by the laser diodes 31 on those two non-light emitting channels. Further speaking of the remaining one with the largest number out of the three continuous non-light emitting channels, a laser diode 31 whose channel number is larger by one than this non-light emitting channel should perform image recording on a small-image area that should originally be subjected to image recording by the laser diode 31 on this non-light emitting channel.

In the case as shown in FIG. 16B where 2ch, 3ch, and 4ch are in the non-light emitting state continuously, the laser diode 31 on 1ch should perform image recording on the small-image areas im2 and im3, and the laser diode 31 on 5ch should perform image recording on the small-image area im4.

More specifically, firstly, the laser diode 31 on 5ch performs image recording on the small-image area im4 during the period when the exposure head 5 is moved through the zeroth interval, and subsequently, the laser diodes 31 on 1ch and 5ch perform standard image recording during the period when the exposure head 5 is moved through the first, i.e., standard interval. The exposure head 5 is further subsequently moved through the second interval and the third interval, i.e., through the post-complementary intervals, during which period the laser diode 31 on 1ch performs image recording on the small-image areas im2 and im3 in sequence, and the laser diode 31 on 5ch performs image recording on the small-image area im6.

In the case as shown in FIG. 16C where 3ch, 4ch, and 5ch are in the non-light emitting state continuously, the laser diode 31 on 2ch performs image recording on the small-image areas im3 and im4, and the laser diode 31 on 6ch performs image recording on the small-image area im5.

More specifically, firstly, the laser diodes 31 on 2ch and 6ch perform image recording on the small-image areas im1 and im5, respectively, during the period when the exposure head 5 is moved through the zeroth interval, and subsequently, the laser diodes 31 on 2ch and 6ch perform standard image recording during the period when the exposure head 5 is moved through the first, i.e., standard interval. The exposure head 5 is further subsequently moved through the second and the third intervals, i.e., through the post-complementary intervals, during which period the laser diode 31 on 2ch performs image recording on the small-image areas im3 and im4 in sequence.

In this preferred embodiment, therefore, even in the case where there are three non-light emitting channels adjacent to one another, image recording can be performed continuously by using laser diodes 31 on light-emitting channels located on both sides of those three non-light emitting channels. In other words, according to this preferred embodiment, continuous image recording is difficult to perform, in principle, only when there are four or more non-light emitting channels adjacent to one another. But, exceptionally in the case where 1ch and 2ch are both in the non-light emitting state, continuous image recording is also difficult to perform.

However, such a pattern of appearance of non-light emitting channels is practically very rare in CTP systems that include laser diodes on the order of several tens to a hundred. Thus, according to this preferred embodiment, even at the appearance of non-light emitting channels under normal use, image recording can be performed continuously by using any one of the modes described above.

<Modifications>

In the preferred embodiments described above, the non-light-emission detector 18 detects the non-light emitting state based on the current value of the operating current. Alternatively, each LD unit 30 may be provided with a photodiode, and the non-light-emission detector 18 may detect the non-light emitting state based on the value of the amount of light detected by those photodiodes.

As another alternative, instead of the non-light-emission detector 18 detecting the non-light emitting state, with a given operating current applied to each laser diode, a visual observation or inspection may be given for the light-emitting/non-light emitting state of each laser diode, and its result may be given to the main controller 11 by a given input unit not shown, based on which channel-by-channel exposure data is generated.

In the preferred embodiments described above, a recording material is the printing plate P on the surface of the drum 1. Alternatively, the surface of the drum 1 itself may be exposed, and an image formed on the surface may be transferred to a given transfer material for image formation.

The transport of the printing plate P into and out of the CTP system 100 and the mounting and demounting of the printing plate P to and from the drum 1 may be conducted by a given system not shown. In this case, another controller for controlling those processing is additionally provided.

While the invention has been shown and described in detail, the foregoing description is in all aspects illustrative and not restrictive. It is therefore understood that numerous modifications and variations can be devised without departing from the scope of the invention.

What is claimed is:

1. An exposure system for exposing a recording material, comprising:
a holder holding a recording material;
a plurality of light sources configured to simultaneously emit exposure light;
an exposure head in which said plurality of light sources are located at dispersed sites at regular intervals in a direction of arrangement along said recording material;
a transport unit moving said exposure head along said recording material;
an exposure-data input unit acquiring general exposure data describing the contents of exposure of said recording material;
a channel-by-channel-exposure-data generator generating, based on said general exposure data, channel-by-channel exposure data describing the contents of exposure performed by each of said plurality of light sources; and
an exposure controller controlling said plurality of light sources so that exposure light is emitted according to the contents of description of said channel-by-channel exposure data, wherein
(a) in a case where said plurality of light sources are all in a light-emitting state,
said channel-by-channel-exposure-data generator generates said channel-by-channel exposure data describing the way that an exposed area should be formed by use of said exposure light emitted from all of said plurality of light sources,
said exposed area being formed by said exposure controller causing said plurality of light sources to emit exposure light according to said channel-by-channel exposure data while causing said transport unit to move said exposure head through only a standard interval having a distance approximately equal to an interval between said plurality of light sources; and
(b) in a case where said plurality of light sources includes some non-light emitting light sources,
said channel-by-channel-exposure-data generator generates said channel-by-channel exposure data describing the way that said exposed area should be formed by use of said exposure light emitted from a specific light source in the light-emitting state during a period when said exposure head is moved through a complementary interval in addition to said standard interval,
said complementary interval being continuous at least either before or after said standard interval and having a distance equal to a multiple of the length of said standard interval by a natural number,
said specific light source being determined by the locations of said non-light emitting light sources,
said exposed area being formed by said exposure controller causing said specific light source to emit exposure light according to said channel-by-channel exposure data while causing said transport unit to move said exposure head through said standard interval and through said complementary interval.

2. The exposure system according to claim 1, further comprising:
a non-light-emission detector detecting non-light emitting light sources out of said plurality of light sources,
said exposure system determining a moving range of said exposure head and said specific light source to be used for exposure, based on the result of detection of said non-light-emission detector.

3. The exposure system according to claim 1, wherein
said complementary interval is both before and after said standard interval, and
(b-1) in a case where said non-light emitting light sources out of said plurality of light sources are limited to either odd-numbered or even-numbered in order of arrangement in said direction of arrangement,
said channel-by-channel-exposure-data generator generates said channel-by-channel exposure data describing the way that exposure should be performed by use of only even-numbered light sources when said non-light-emitting light sources are odd-numbered in said order of arrangement, or performed by use of only odd-numbered light sources when said non-light emitting light sources are even-numbered in said order of arrangement.

4. The exposure system according to claim 1, wherein
said complementary interval is both before and after said standard interval, and
(b-2) in a case where said non-light emitting light sources out of said plurality of light sources include both odd-numbered and even-numbered ones in order of arrangement in said direction of arrangement, and none of said non-light emitting light sources are adjacent to one another,
said channel-by-channel-exposure-data generator generates said channel-by-channel exposure data describing the way that areas that should originally be exposed by said non-light emitting light sources should be exposed by any of light sources adjacent to said non-light emitting light sources, during a period when said exposure head is moved through said complimentary interval.

5. The exposure system according to claim 1, wherein
said complementary interval is both before and after said standard interval, and
(b-3) in a case where said non-light emitting light sources out of said plurality of light sources include both odd-numbered and even-numbered ones in order of arrangement in said direction of arrangement, and any two of said non-light emitting light sources are adjacent to each other,
said channel-by-channel-exposure-data generator generates said channel-by-channel exposure data describing the way that areas that should originally be exposed by said adjacent two non-light emitting light sources should be exposed by light-emitting light sources that are adjacent to said adjacent two non-light emitting light sources, during a period when said exposure head is moved through said complementary interval.

6. The exposure system according to claim 1, wherein
said complementary interval after said standard interval has a longer distance than said standard interval.

7. The exposure system according to claim 1, wherein
said complementary interval is after said standard interval, and
(b-4) in a case where said plurality of light sources include said non-light emitting light sources,
said channel-by-channel-exposure-data generator generates said channel-by-channel exposure data describing the way that areas that should originally be exposed by said non-light emitting light sources should be exposed by light-emitting light sources, out of said plurality of light sources, which are immediately adjacent to said non-light emitting light sources, during a period when said exposure head is moved through said complementary interval.

* * * * *